United States Patent
Osawa (10) Patent No.: US 7,359,000 B2
(45) Date of Patent: Apr. 15, 2008

(54) IMAGE PICKUP APPARATUS, CONTROL METHOD THEREFOR, AND COMPUTER-READABLE PROGRAM FOR IMPLEMENTING THE CONTROL METHOD

(75) Inventor: Toshifumi Osawa, Tokyo (JP)

(73) Assignee: Canon Kabushiki Kaisha (JP)

( * ) Notice: Subject to any disclaimer, the term of this patent is extended or adjusted under 35 U.S.C. 154(b) by 765 days.

(21) Appl. No.: 10/715,922

(22) Filed: Nov. 18, 2003

(65) Prior Publication Data

US 2004/0151488 A1 Aug. 5, 2004

(30) Foreign Application Priority Data

Nov. 18, 2002 (JP) ............................. 2002-333548
Nov. 18, 2003 (JP) ............................. 2003-388415

(51) Int. Cl.
*H04N 5/235* (2006.01)
(52) U.S. Cl. ..................................... 348/362
(58) Field of Classification Search ............... 348/362, 348/363, 364, 229.1; 396/96
See application file for complete search history.

(56) References Cited

U.S. PATENT DOCUMENTS

| 5,510,837 | A | * | 4/1996 | Takei ........................... 348/362 |
| 5,619,265 | A | * | 4/1997 | Suzuki et al. ................ 348/362 |
| 5,655,161 | A | * | 8/1997 | Takagi ......................... 396/271 |
| 5,677,733 | A | * | 10/1997 | Yoshimura et al. ......... 348/362 |
| 6,215,960 | B1 | * | 4/2001 | Hamada et al. ............... 396/96 |
| 6,560,412 | B2 | * | 5/2003 | Iwasaki ....................... 396/157 |
| 6,570,620 | B1 | * | 5/2003 | Yoshimura et al. ......... 348/362 |
| 6,839,087 | B1 | * | 1/2005 | Sato ............................ 348/362 |
| 6,906,744 | B1 | * | 6/2005 | Hoshuyama et al. ..... 348/223.1 |
| 2003/0020826 | A1 | * | 1/2003 | Kehtarnavaz et al. ....... 348/362 |

* cited by examiner

*Primary Examiner*—Lin Ye
*Assistant Examiner*—Amy Hsu
(74) *Attorney, Agent, or Firm*—Rossi, Kimms & McDowell LLP

(57) ABSTRACT

There is provided an image pickup apparatus that is capable of eliminating the influence of errors attributed to differences in characteristics between lens devices attached to the image pickup apparatus such as a camera or errors attributed to differences in characteristics between optical component elements within the main body of the image pickup apparatus, to thereby enable setting a proper exposure compensation value. An image pickup device receives light passing through a lens device and outputs an image signal, and a photometric sensor receives the light passing through the lens device and outputs luminance information. A main control circuit sets an exposure compensation value according to an output from the photometric sensor. Specifically, the main control circuit sets a first exposure compensation value according to the luminance information outputted from the photometric sensor, to cause the image pickup device to carry out a first storage of the light passing through the lens device, based on the set first exposure compensation value, and sets a second exposure compensation value according to the result of the first storage, to cause the image pickup device to carry out a second storage of the light passing through the lens device, based on the set second exposure compensation value.

12 Claims, 7 Drawing Sheets

| PD11 | PD12 | PD13 | PD14 | PD15 | PD16 | PD17 |
|------|------|------|------|------|------|------|
| PD21 | PD22 | PD23 | PD24 | PD25 | PD26 | PD27 |
| PD31 | PD32 | PD33 | PD34 | PD35 | PD36 | PD37 |
| PD41 | PD42 | PD43 | PD44 | PD45 | PD46 | PD47 |
| PD51 | PD52 | PD53 | PD54 | PD55 | PD56 | PD57 |

| E11 | E12 | E13 | E14 | E15 | E16 | E17 |
|-----|-----|-----|-----|-----|-----|-----|
| E21 | E22 | E23 | E24 | E25 | E26 | E27 |
| E31 | E32 | E33 | E34 | E35 | E36 | E37 |
| E41 | E42 | E43 | E44 | E45 | E46 | E47 |
| E51 | E52 | E53 | E54 | E55 | E56 | E57 |

IMAGE PICKUP APPARATUS, CONTROL METHOD THEREFOR, AND COMPUTER-READABLE PROGRAM FOR IMPLEMENTING THE CONTROL METHOD

BACKGROUND OF THE INVENTION

1. Field of the Invention

The present invention relates to an image pickup apparatus such as a camera that is capable of taking a still image or a moving image and compensating for an exposure amount, a control method therefor, and a computer-readable program for implementing the control method.

2. Description of the Related Art

Conventionally, as a photometric device or an exposure control device used in an image pickup apparatus such as a camera, a technique has been brought into practical use in which an oject field is divided into a plurality of areas, a plurality of pieces of field luminance information are obtained for the respective areas, to obtain a suitable exposure using a predetermined algorithm, as disclosed in Japanese Laid-Open Patent Publication (Kokai) No. 63-279124, for example.

For example, U.S. Pat. No. 4,523,101 discloses a technique of determining a storage time of an image pickup element in accordance with an output of a photometric sensor for obtaining luminance information of the field.

In many single-lens reflex cameras, a photometric sensor is built in a finder optical system that uses a pentaprism so that some of rays diffused by a diffusing plate called a "focussing screen" become incident on the photometric sensor. In this construction, the photometric sensor is disposed at a location displaced from the optical axis of the finder optical system which is oriented toward an eyepiece lens of the finder.

With the above construction, an amount of light incident on the photometric sensor varies depending on the brightness or speed (F number) of an interchangeable lens attached to the camera, an exit pupil position of, the interchangeable lens, and individual difference such as diffusion characteristics of the focussing screen. As a result, in particular, in the case where luminance information is obtained for the respective divided areas of the photographic screen, there can be a large difference in the light amount balance between a central part and peripheral parts of the screen, which can hinder a determination as to whether the subject is backlit, resulting in an inappropriate photographic exposure being calculated. To fully prevent this, information on the F number unique to the interchangeable lens is inputted from the interchangeable lens to the camera to thereby correct an output signal of the photometric sensor. However, it is difficult to properly correct the signal for every interchangeable lens.

Digital cameras using image pickup devices that have become increasingly widespread in recent years have less latitude for errors in exposure than film cameras, so that even minor errors in exposure exert greater effects upon obtained images than film cameras.

SUMMARY OF THE INVENTION

It is an object of the present invention to provide an image pickup apparatus and a control method therefor that are capable of solving the optical problems described above, that is, capable of eliminating the influence of errors attributed to differences in characteristics between lens devices attached to the image pickup apparatus such as a camera or errors attributed to differences in characteristics between optical component elements within the main body of the image pickup apparatus, to thereby enable setting a proper exposure compensation value, and a computer-readable program for implementing the control method.

To attain the above object, in a first aspect of the present invention, there is provided an image pickup apparatus comprises a taking lens, a main body, an image pickup device that receives light passing through the taking lens and outputs an image signal, a photometric device that receives the light passing through the taking lens and outputs luminance information, a control circuit that sets an exposure compensation value according to an output from the photometric device, wherein the control circuit sets a first exposure compensation value according to the luminance information outputted from the photometric device, to cause the image pickup device to carry out a first storage of the light passing through the taking lens, based on the set first exposure compensation value, and sets a second exposure compensation value according to a result of the first storage, to cause the image pickup device to carry out a second storage of the light passing through the taking lens, based on the set second exposure compensation value.

With the above arrangement according to the first aspect of the present invention, the exposure compensation value which includes errors attributed to characteristics of the individual taking lens attached to the main body and errors attributed to characteristics of individual optical component parts within the main body is provisionally determined, the first storage is carried out based on the exposure compensation value, and then the exposure compensation value is set again using the result of the first storage. Thus, it is possible to set an exposure compensation value with all the above errors canceled.

In other words, even if a difference occurs in light amount balance between a central part and peripheral parts of the screen due to characteristics of individual taking lens used with the main body, the influence of the difference can be eliminated.

Further, even if there are variations in characteristics of optical elements such as the focussing screen disposed on the optical path other than the image pickup device, the influence of such variations can be eliminated.

Preferably, the taking lens is removably attached to the main body, and the control circuit acquires information on characteristics of the taking lens from the taking lens and sets the exposure compensation value according to the luminance information outputted from the photometric device and the information on characteristics of the taking lens to cause the image pickup device to carry out the first storage.

Also preferably, the image pickup apparatus further comprises a mirror element, and wherein the light passing through the taking lens reaches the photometric device when the mirror element is in a first position, and the light passing through the taking lens does not reach the photometric device when the mirror element is in a second position.

More preferably, the image pickup apparatus further comprises an eyepiece lens used in observing a subject by a user, and an optical element that divides the light passing through the taking lens into light reaching the photometric device and light reaching the eyepiece lens.

Also preferably, the photometric device outputs luminance information a plurality of pieces of luminance information for a plurality of areas into which a photographic screen is divided.

Also preferably, the first and second exposure compensation values each include at least one of a storage time and an output amplification factor of the image pickup device, and the control circuit causes the image pickup device to carry out the first storage by changing the one of the storage time and the output amplification factor based on the first exposure compensation value, and causes the image pickup device to carry out the second storage by changing the one of the storage time and the output amplification factor based on the second exposure compensation value.

To attain the above object, in a second aspect of the present invention, there is provided an image pickup apparatus comprises a taking lens, a main body, an image pickup device that receives light passing through the taking lens and generates an image signal, a photometric device disposed at a location different from a location at which the image pickup device is disposed, for receiving the light passing through the taking lens and outputting luminance information, a mirror element movably disposed between the taking lens and the image pickup device, for reflecting the light passing through the taking lens in a direction different from the image pickup device, an optical element disposed between the photometric device and the mirror element, for guiding light reflected from the mirror element to the photometric device, a control circuit that sets an exposure compensation value according to an output from the photometric device, wherein the control circuit sets a first exposure compensation value according to the luminance information outputted from the photometric device, to cause the image pickup device to carry out a first storage of the light passing through the taking lens, based on the set first exposure compensation value, and sets a second exposure compensation value according to a result of the first storage, to cause the image pickup device to carry out a second storage of the light passing through the taking lens, based on the set second exposure compensation value.

Preferably, the light passing through the taking lens reaches the photometric device when the mirror element is in a first position, and the light passing through the taking lens does not reach the photometric device when the mirror element is in a second position.

Also preferably, the image pickup apparatus further comprises an eyepiece lens used in observing a subject by a user, and wherein the optical element divides the light reflected from the mirror element into light reaching the photometric device and light reaching the eyepiece lens.

To attain the above object, in a third aspect of the present invention, there is provided a control method for an image pickup apparatus including a taking lens, a main body, an image pickup device that receives light passing through the taking lens and outputs an image signal, and a photometric device that receives the light passing through the taking lens and outputs luminance information, the control method comprises a photometric step of causing the photometric device to calculate field luminance information, a first compensation step of setting a first exposure compensation value based on the field luminance information calculated in the photometric step, a first storage step of causing the image pickup device to carry out a first storage of the light passing through the taking lens, based on the first exposure compensation value set in the first compensation step, a second compensation step of setting a second exposure compensation value according to a result of the first storage carried out in the first storage step, and a second storage step of causing the image pickup device to carry out a second storage of the light passing through the taking lens, based on the second exposure compensation value set in the second compensation step.

Preferably, the taking lens is removably attached to the main body, and in the first compensation step, information on characteristics of the taking lens is acquired from the taking lens and the exposure compensation value is set according to the information on characteristics of the taking lens and the luminance information.

To attain the above object, in a fourth aspect of the present invention, there is provided a control method for an image pickup apparatus including a taking lens, an image pickup device, and a photometric device disposed at a location different from a location at which the image pickup device is disposed, the image pickup apparatus being capable of switching between a state in which light passing through the taking lens is caused to reach the photometric device, and a state in which the light passing through the taking lens is not caused to reach the photometric device, the control method comprises, a photometric step of causing the photometric device to determine field luminance information, a first compensation step of setting a first exposure compensation value based on the field luminance information determined in the photometric step, a first storage step of causing the image pickup device to carry out a first storage of the light passing through the taking lens, based on the first exposure compensation value set in the first compensation step, a second compensation step of setting a second exposure compensation value according to a result of the first storage carried out in the first storage step, and a second storage step of causing the image pickup device to carry out a second storage of the light passing through the taking lens, based on the second exposure compensation value set in the second compensation step.

Preferably, the light passing through the taking lens is caused to reach only one of the image pickup device and the photometric device.

To attain the above object, in a fifth aspect of the present invention, there is provided a computer-readable program for implementing a control method for an image pickup apparatus including a taking lens, a main body, an image pickup device that receives light passing through the taking lens and outputs an image signal, and a photometric device that receives the light passing through the taking lens and outputs luminance information, the program comprises a photometric module for causing the photometric device to calculate field luminance information, a first compensation module for setting a first exposure compensation value based on the field luminance information calculated by the photometric module, a first storage module for causing the image pickup device to carry out a first storage of the light passing through the taking lens, based on the first exposure compensation value set by the first compensation module, a second compensation module for setting a second exposure compensation value according to a result of the first storage carried out by the first storage module, and a second storage module for causing the image pickup device to carry out a second storage of the light passing through the taking lens, based on the second exposure compensation value set by the second compensation module.

To attain the above object, in a sixth aspect of the present invention, there is provided a computer-readable program for implementing a control method for an image pickup apparatus including a taking lens, an image pickup device, and a photometric device disposed at a location different from a location at which the image pickup device is disposed, the image pickup apparatus being capable of switching between a state in which light passing through the taking lens is caused to reach the photometric device, and a state in which the light passing through the taking lens is not caused to reach the photometric device, the program comprises a photometric module for causing the photometric device to determine field luminance information, a first compensation module for setting a first exposure compensation value based on the field luminance information determined by the photometric module, a first storage module for causing the image pickup device to carry out a first storage of the light passing through the taking lens, based on the first exposure compensation value set by the first compensation module, a second compensation module for setting a second exposure compensation value according to a result of the first storage carried out by the first storage module, and a second storage module for causing the image pickup device to carry out a second storage of the light passing through the taking lens, based on the second exposure compensation value set by the second compensation module.

Other objects and advantages besides those discussed above will be apparent to those skilled in the art from the description of preferred embodiments of the present invention which follows. In the description, reference is made to accompanying drawings, which form a part hereof, and which illustrate an example of the present invention. Such example, however, is not exhaustive of the various embodiments of the present invention, and therefore reference is made to the claims which follow the description for determining the scope of the present invention.

DETAILED DESCRIPTION OF THE PREFERRED EMBODIMENTS

The present invention will now be described in detail with reference to the drawings showing preferred embodiments thereof.

Figure 1:
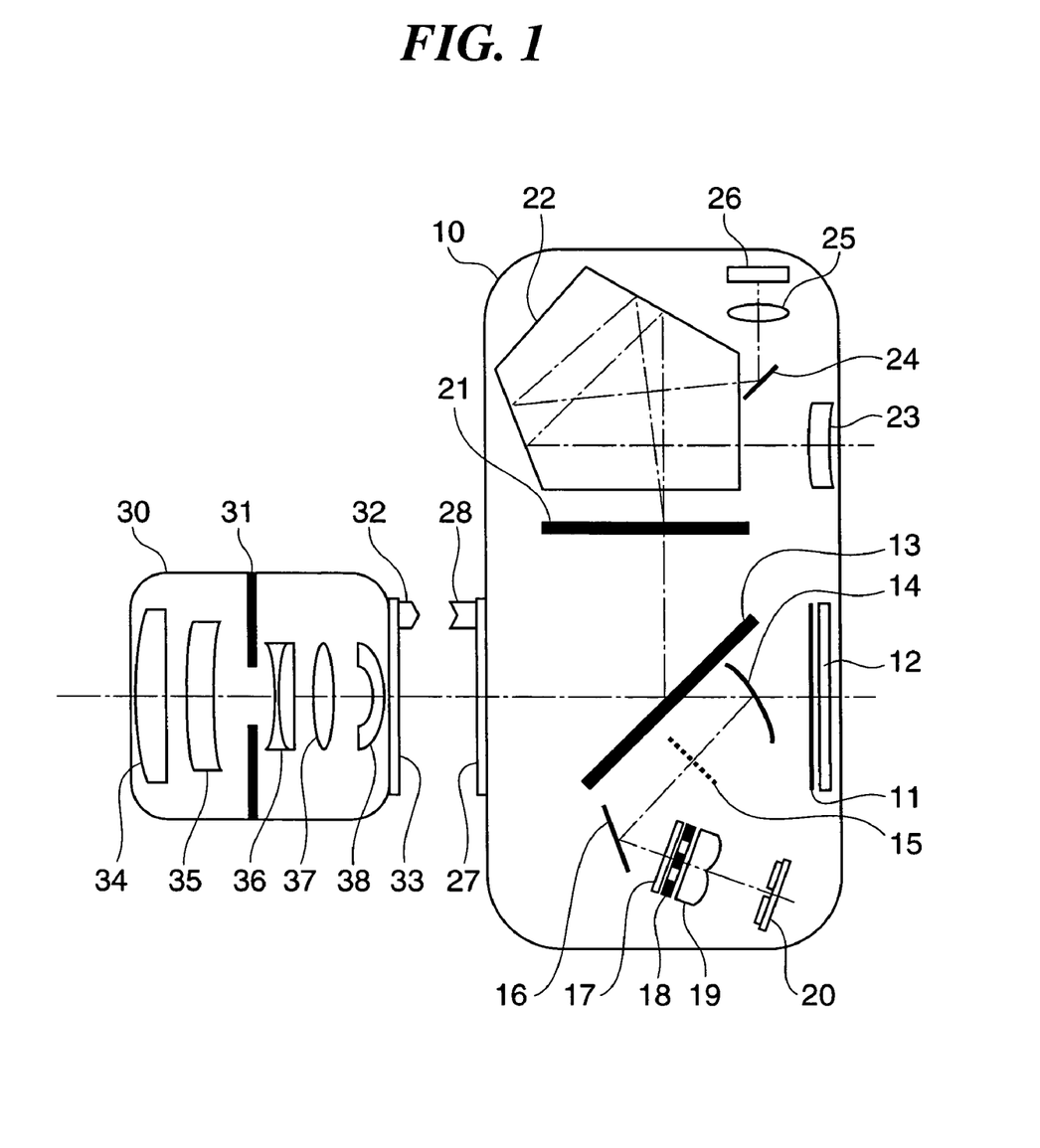
FIG. 1 is a cross-sectional view showing the arrangement and construction of optical component elements provided in the main body of a camera as an image pickup apparatus according to a first embodiment of the present invention and the arrangement and construction of optical component elements of an interchangeable lens device attached to the camera.

FIG. 1 is a cross-sectional view showing the arrangement and construction of optical component parts of a camera as an image pickup apparatus according to a first embodiment of the present invention. The camera of FIG. 1 is a so-called single lens-reflex camera to which a selected one of a plurality of interchangeable lens devices can be attached.

Figure 2:
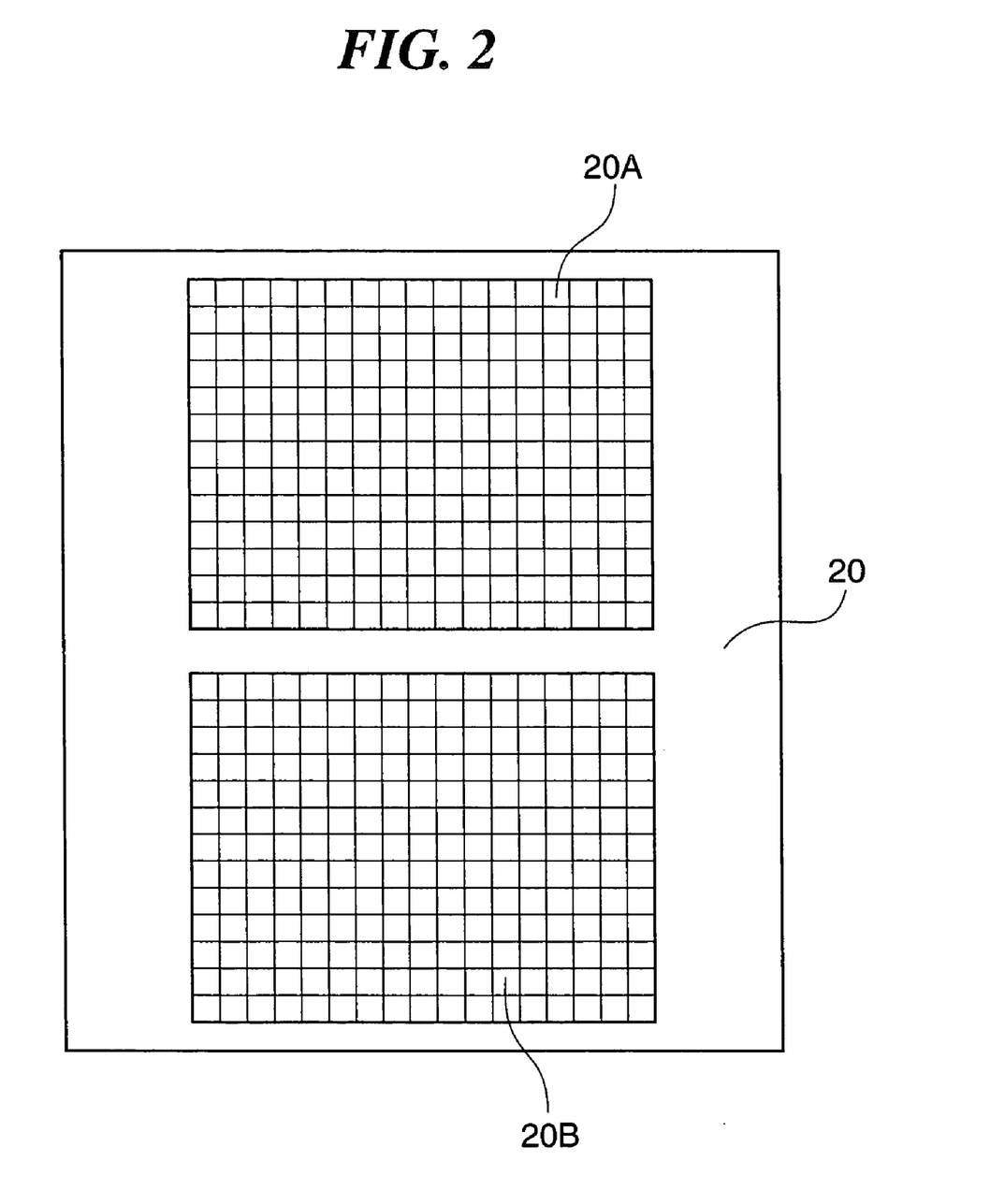
FIG. 2 is a diagram showing an example of the construction of an incident light sensor section of a focus detection sensor of the camera of FIG. 1.

In FIG. 1, reference numeral 10 designates a camera body, and reference numeral 30 designates an interchangeable lens device that is removably attached to the camera body 10. In the camera body 10, there are provided a mechanical shutter 11, an image pickup device 12, which is an area type storage-type photoelectric conversion element such as a CMOS or a CCD and receives and converts a subject imager into an electric signal, a main mirror 13 that is semi-transparent, and a first reflective mirror 14. The main mirror 13 and the first reflective mirror 14 are both disposed to be swung upwards during photography such that light passing through the lens device 30 can reach the image pickup device 12. Further provided in the camera body 10 are a paraxial image forming plane that is disposed at a location being conjugate to a surface of the image pickup device 12 and on which light reflected by the first reflective mirror 14 forms an image, a second reflective mirror 16, an infra-red blocking filter 17, an diaphragm 18 with two apertures, a secondary image forming lens 19, and a focus detection sensor 20. The focus detection sensor 20 is implemented by an area type storage-type photoelectric conversion element such as a CMOS or a CCD. As shown in FIG. 2, the focus detection sensor 20 is comprised of a part of incident light sensor sections 20A and 20B corresponding to the respective two apertures of the diaphragm 18, each consisting of a multiplicity of divided areas. The incident light sensor sections 20A and 20B, a signal storage section and peripheral circuitry for signal processing and other component elements are built up as an integrated circuit on a single chip. As described in U.S. Pat. No. 5,839,00, for example, the component elements from the first reflective mirror 14 to the focus detection sensor 20 can perform focus detection using the image deviation method by calculating an image deviation amount at an arbitrary position within the object field. Detailed description of the focus detection is omitted since it is well known in the art.

Figure 3:
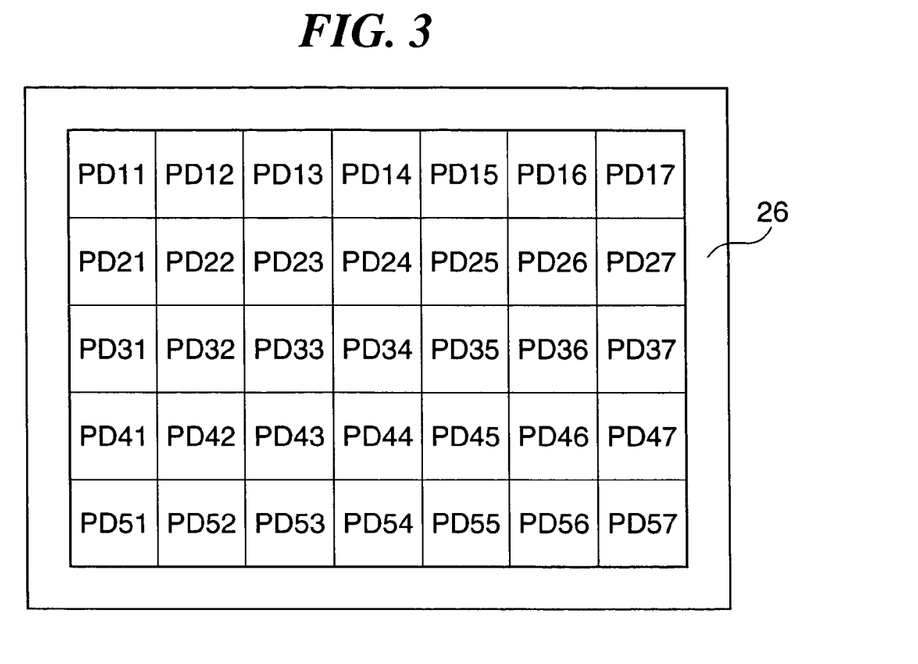
FIG. 3 is a diagram showing an example of the construction of an incident light sensor section of a focus detection sensor of the camera of FIG. 1.

In FIG. 1, reference numeral 21 designates a focussing screen having diffusivity, 22 a pentaprism, 23 an eyepiece lens used in observing a subject by a user, 24 a third reflective mirror, 25 a converging lens, and 26 a photometric sensor for obtaining information relating to luminance of a subject. The photometric sensor 26 is implemented by a photoelectric conversion element such as a silicon photo-diode, and is constructed as shown in FIG. 3 with an incident light sensor section consisting of a plurality of divided areas in the form of a lattice and covering substantially the entire photographic screen. As shown in FIG. 3, in the present embodiment, the incident light sensor section is comprised of light incident sections formed of thirty-five areas divided into seven columns and five rows. The incident light sections formed of thirty-five divided areas will be hereinafter designated by PD11 to PD17, PD21 to PD27, PD31 to PD37, PD41 to PD47, PD51 to PD57. The photometric sensor 26 is configured as part of an integrated circuit built on comprised of a signal amplifier section and peripheral circuitry for signal processing and other component elements which are built up on a single chip.

The focussing screen 21, the pentaprism 22, and the eyepiece lens 23 constitute a finder optical system. Out of light rays that have been reflected by the main mirror 13 and diffused by the focussing screen 21, some light rays other than those reaching the eyepiece lens 23 are incident on the photometric sensor 26. The light rays incident on the photometric sensor 26 are affected by the brightness (F number) of the interchangeable lens 30, the exit pupil position, and variations in diffusion characteristics of the focussing screen 21, and accordingly, an output signal of the photometric sensor 26 contains an error that depends on these variation factors.

Figure 4:
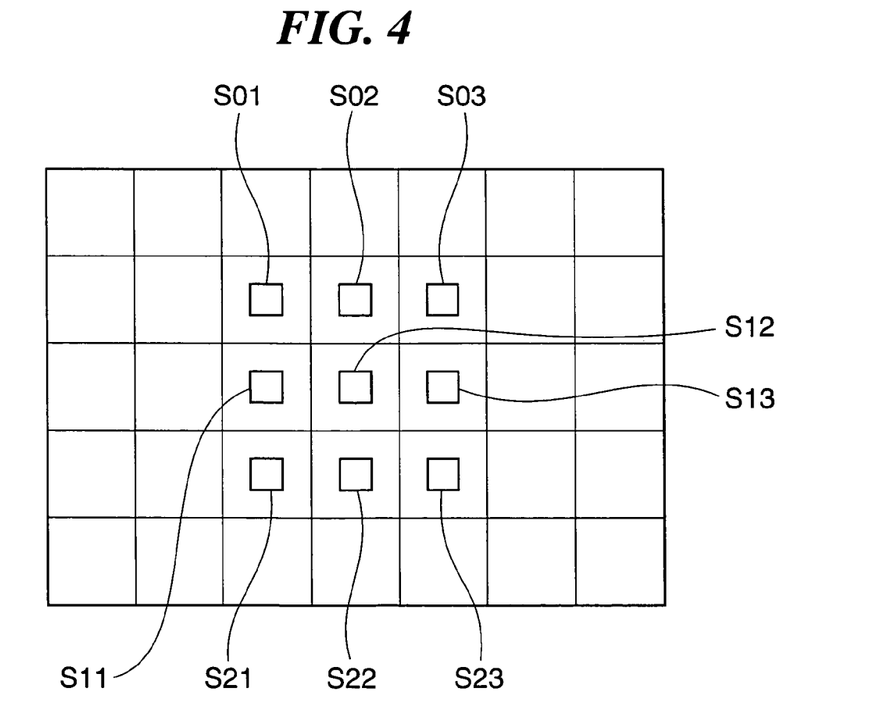
FIG. 4 is a diagram showing an example of the positional relationship between focus detection positions within the photographic screen that are detected by a focus detection means such as the focus detection sensor appearing in FIG. 1 and the photometric sensor of FIG. 3.

FIG. 4 is a schematic diagram showing the positional relationship between focus detection positions within the photographic screen that are detected by a focus detection means implemented by the focus detection sensor 20 and the photometric sensor 26 of FIG. 3 consisting of thirty-five divided areas. In the present embodiment, an example is given with nine focus detection positions numbered S01, S02, S03, S11, S12, S13, S21, S22, and S23 in the photographic screen. At the focus detection position S01, focus detection is carried out at a position corresponding to the incident light section PD23 of the photometric sensor 26; at the focus detection position S02, focus detection is carried out at a position corresponding to the incident light section PD24 of the photometric sensor 26; at the focus detection position S03, focus detection is carried out at a position corresponding to the incident light section PD25 of the photometric sensor 26; and at the focus detection position S11, focus detection is carried out at a position corresponding to the incident light section PD33 of the photometric sensor 26. This is the same for the other focus detection positions, and focus detection is carried out at positions corresponding to the respective incident light sections of the photometric sensor 26.

In FIG. 1, reference numeral 27 designates a mount section for attaching the lens device 30 to the camera body 10. Reference numeral 28 designates a contact for communication of information to and from the lens device 30. The lens device 30 is comprised of a diaphragm 31, a contact 32 for communication of information to and from the camera body 10, a mount section 33 for attaching the interchangeable lens 30 to the camera body 10, and optical lenses 34 to 38 that constitute the taking lens.

Figure 5:
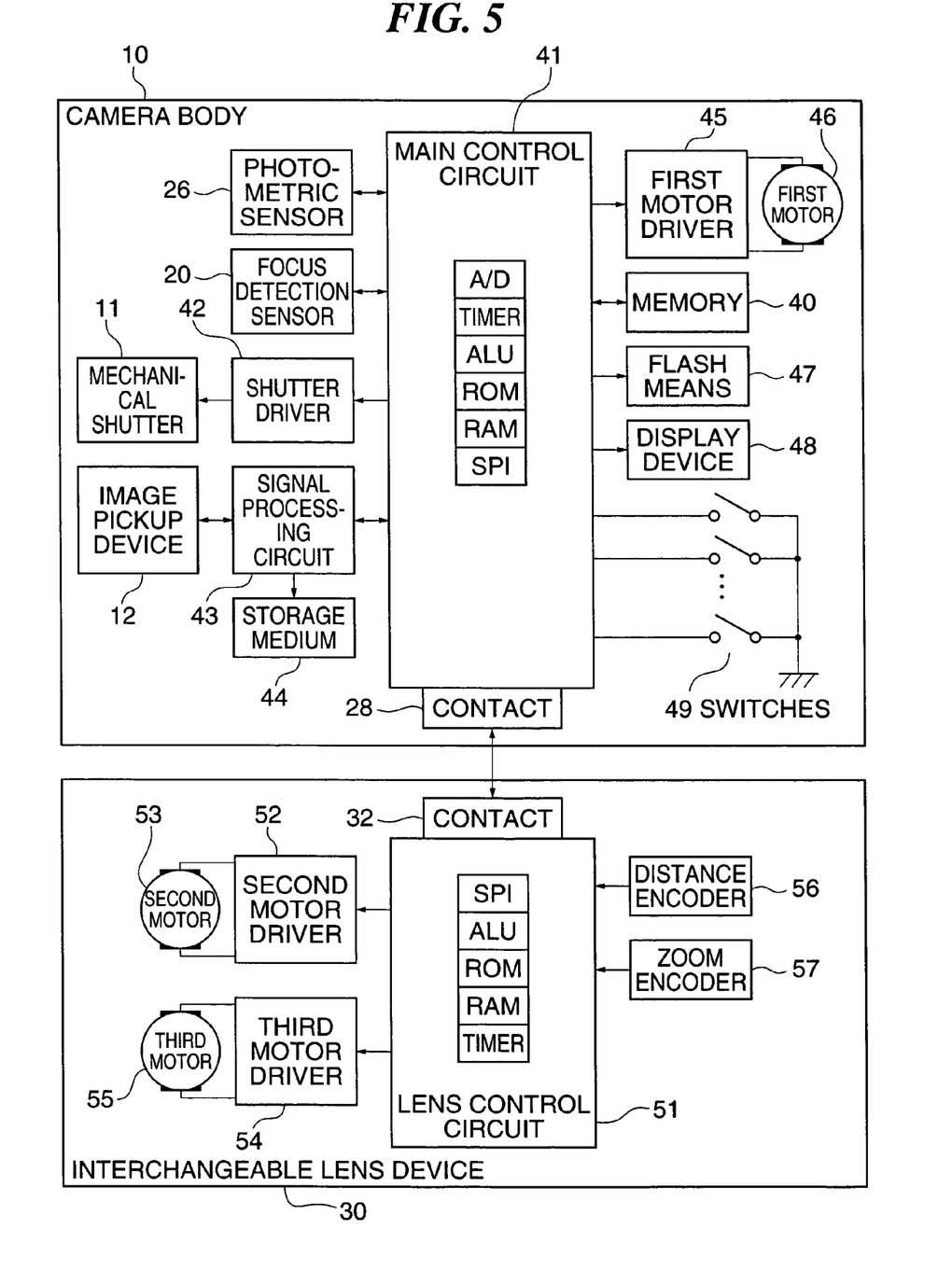
FIG. 5 is a block diagram showing an example of the arrangement of electrical circuits of a camera body and an interchangeable lens appearing in FIG. 1.

FIG. 5 is a block diagram showing an example of the arrangement of electrical circuits of the camera body 10 and the interchangeable lens 30 appearing in FIG. 1. In FIG. 5, reference numeral 41 designates a main control circuit that is implemented by a single-chip microcomputer provided therein with an ALU, a ROM, a RAM, an A/D converter, a timer, a serial communication port (SPI), and other component elements, and controls the entire camera system comprised of the camera body 10 and the lens device 30. A detailed control sequence of the main control circuit 41 will be described later. Output signals of the focus detection sensor 20 and the photometric sensor 26. are connected to an A/D converter input terminal of the main control circuit 41. It should be noted that a program code in which a control algorithm for the camera is described is stored in a memory 40 and the main control circuit 41 reads out the program code from the memory 40 to thereby control the camera.

Reference numeral 42 designates a shutter driver that is connected to an output terminal of the main control circuit 41 and drives the mechanical shutter 11 shown in FIG. 1. Reference numeral 43 designates a signal processing circuit that controls the image pickup device 12 in accordance with instructions from the main control circuit 41, carries out A/D conversion on an input image pickup signal outputted from the image pickup device 12, and carries out signal processing on the resulting digital signal to obtain an image signal. The signal processing circuit 43 also carries out required image processing on the obtained image signal. Reference numeral 44 designates a storage medium implemented by a nonvolatile memory, such as a flash ROM, or an optical disc or the like, and stores the image processed image signal. Reference numeral 45 designates a first motor driver connected to an output terminal of the main control circuit 41 and is controlled by the main control circuit 41 to drive a first driver 46 to switch the position of the main mirror 13 and the first reflective mirror 14 between a first position in which the main mirror 13 and the first reflective mirror 14 are swung upward so as to permit light rays passing through the lens device 30 to reach the pickup device 12, and a second position in which the main mirror 13 and the first reflective mirror 14 are swung downward so as to permit light rays passing through the lens device 30 to reach the eyepiece lens 23, the photometric sensor 26 and the focus detection sensor 20. Reference numeral 47 designates a flash means that emits light when taking a picture if the luminance of the subject is insufficient. The flash means 47 emits light in accordance with an output signal of the main control circuit 41. Reference numeral 48 designates a display device that is composed of a liquid crystal panel or the like and displays information such as the number of photographs, date information, and exposure information. Respective display segments of the display device 48 are controlled to be lit or extinguished in accordance with an output signal from the main control circuit 41. Reference numeral 49 designates various switches, including a release button for starting a shooting operation. Reference numeral 28 designates the same contact as shown in FIG. 1, to which I/O signals of the serial communication port of the main control circuit 41 are connected.

Components on the interchangeable lens 30 side will be described. Reference numeral 51 designates a lens control circuit that is implemented by a single-chip microcomputer provided therein with an ALU, a ROM, a RAM, a timer, a serial communication port (SPI), and other component elements. Reference numeral 52 designates a second motor driver that is connected to an output terminal of the lens control circuit 51 and is controlled by the lens control circuit 51 to drive a second motor 53 to move the taking lenses 34 to 38. Reference numeral 54 designates a third motor driver that is connected to an output terminal of the lens control circuit 51 and is controlled by the lens control circuit 51 to drive a third motor 55 that opens and closes the diaphragm 31 shown in FIG. 1. Reference numeral 56 designates a distance encoder that obtains information relating to an extended amount of a focus adjustment lens, that is, the distance from the subject (subject distance) and is connected to an input terminal of the lens control circuit 51. Reference numeral 57 designates a zoom encoder for obtaining focal distance information when taking a picture in the case where the interchangeable lens 30 is a zoom lens, and is connected to an input terminal of the lens control circuit 51. Reference numeral 32 designates the contact shown in FIG. 1 to which input and output signals of the serial communication port of the lens control circuit 51 are connected, and via which data are transmitted and received to and from the camera body 10 via the contact 28 thereof.

When the interchangeable lens 30 has been attached to the camera body 10, the respective contacts 28 and 32 are connected so that the lens control circuit 51 can perform data communication with the main control circuit 41 of the camera body 10. Optical information unique to the lens that is required for the main control circuit 41 of the camera body 10 to perform focus detection and exposure calculation, and information relating to the subject distance or focal distance information based on an output from the distance encoder 56 or the zoom encoder 57 is transmitted from the lens control circuit 51 to the main control circuit 41 of the camera body 10. Focus adjustment information and aperture information found as a result of the focus detection and the exposure calculation carried out by the main control circuit 41 of the camera body 10 is transmitted from the main control circuit 41 to the lens control circuit 51, whereby the lens control circuit 51 controls the second motor driver 52 according to the focus adjustment information and controls the third motor driver 54 according to the aperture information.

Figure 6:
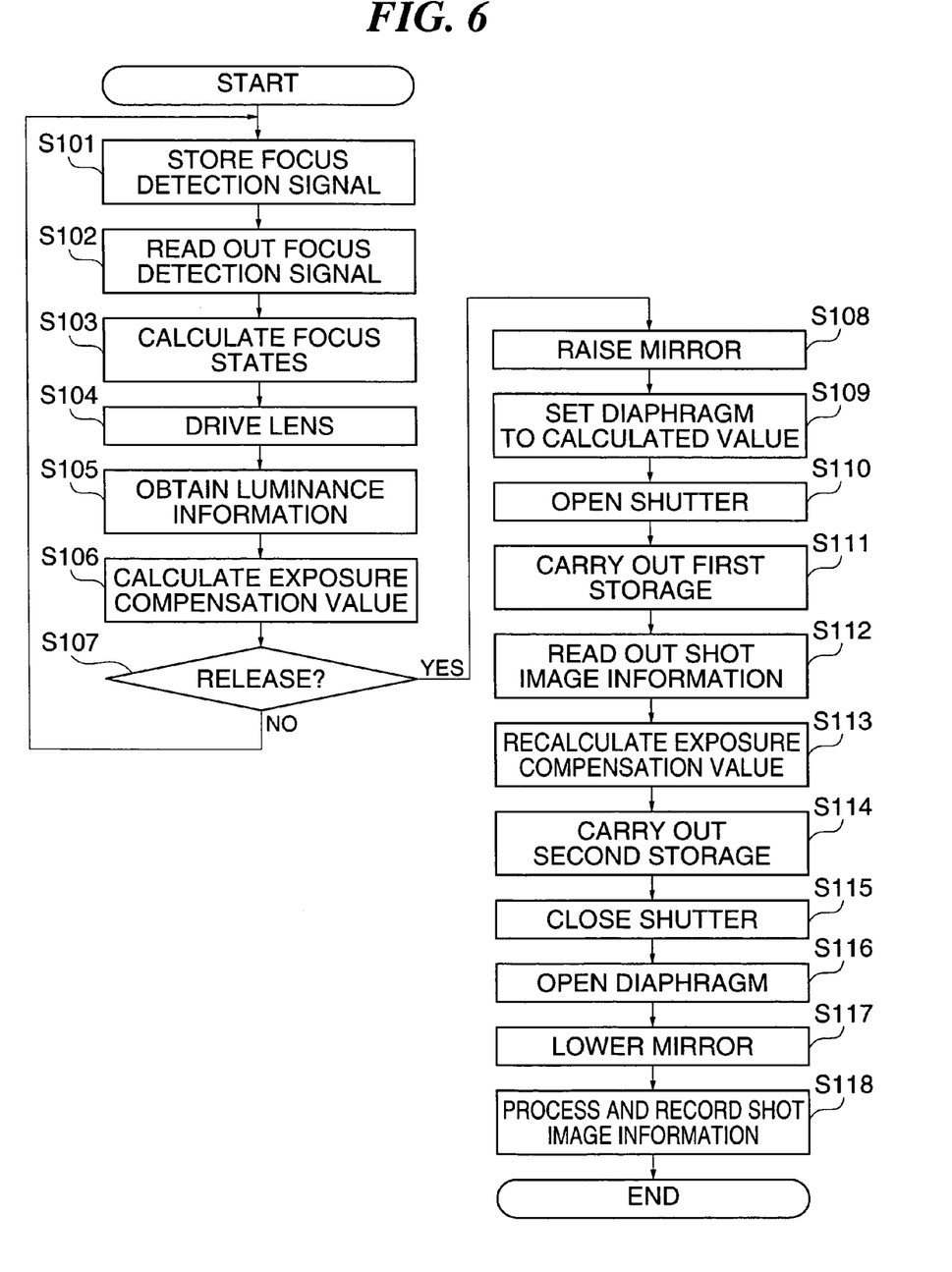
FIG. 6 is a flowchart showing an operation executed by a control circuit of the camera of FIG. 1.

Next, an operation sequence according to the present embodiment that is instructed by the main control circuit 41 of the camera body 10 will be described in detail with reference to a flowchart in FIG. 6. When a power switch, not shown, is turned on, the main control circuit 41 is rendered operative. When a first stroke switch of the release button is turned on, the main control circuit 41 starts operations of steps S101 et seq. in FIG. 6.

A control signal is outputted to the focus detection sensor 20 to cause the same to carry signal storage(step S101).

The stored signal by the focus detection sensor 20 is read out and subjected to A/D conversion into digital data. Various kinds of data corrections that are required for shading and the like are carried out on the digital data that have been read in (step S102).

Lens information and the like required for carrying out focus detection is acquired from the lens control circuit 51 and the focus states of respective parts of the photographic screen are calculated from the acquired lens information and the digital data acquired from the focus detection sensor 20 (step S103). A region in the photographic screen for which the subject image is to be focussed is determined from the obtained focus states of the respective parts of the photographic screen by a method disclosed, for example, in Japanese Laid-Open Patent Publication (Kokai) No. 11-190816. The manner of determining the region for which the subject image is to be focussed is well known in the art, and description of which is therefore omitted. A lens moving amount for focusing in accordance with the focus state in the determined region is then calculated.

The calculated lens moving amount is outputted to the lens control circuit 51 (step S104). In accordance with this amount, the lens control circuit 51 outputs a signal to the second motor driver 52 to drive the second motor 53 so as to drive the focus adjustment lens. By doing so, the taking lens is focused on the subject.

Signals are read from the respective incident light sections PD11 to PD57 as the thirty-five divided areas of the photometric sensor 26, and the read signals are subjected to A/D conversion, to thereby obtain luminance information of respective parts of the screen (step S105).

In the next step S106, required lens information and the like is acquired from the lens control circuit 51, the inputted luminance information for respective parts of the photographic screen is corrected, and luminance of the entire screen is calculated with a weighting being placed on luminance information on the luminance of divided areas corresponding to the above region to be focussed. Then, it is determined whether the subject is backlit by comparing the luminance information on the luminance of the divided areas corresponding to the region to be focussed with luminance information on the luminance of other regions, i.e. peripheral parts of the screen. When it is determined that the subject is backlit, the calculated luminance of the entire screen is corrected by a predetermined amount. If the luminance of the entire screen is lower than a predetermined value, the camera is set to carry out flashing. Based on the thus calculated luminance information for the entire screen, an exposure compensation value such as a storage time and an output amplification factor for the image pickup device 12, and an aperture value or a shutter speed, that are appropriate for taking a picture is provisionally determined and displayed on the display device 48. As mentioned before, the light metering result of the photometric sensor 26 contains some error, but, in this step S106 the exposure compensation value information is displayed so that the photographer can know information such as luminance information on the field. Also, the error is corrected later in a step S113, referred to later.

The main control circuit 41 waits for a second stroke switch of the shutter button to be turned on (step S107). If this switch is not turned on, the process returns to the step S101. If the switch is turned on, the process proceeds to a step S108.

In the step S108, a control signal is outputted to the first motor driver 45 to drive the first motor 46 so that the main mirror 13 and the first reflective mirror 14 are swung upward.

The aperture value information calculated in the step S106 is outputted to the lens control circuit 51 (step S109). In accordance with this information, the lens control circuit 51 outputs a signal to the third motor driver 54 to drive the third motor 55 and thereby drive the diaphragm 31 so that the taking lens is placed into a state where the diaphragm 31 is set to the calculated aperture value.

A signal is outputted to the shutter driver 42, to place the shutter 11 into an opened state (step S110). By doing so, light passing through the taking lens becomes incident on the image pickup device 12 to enable image pickup.

The storage time and output amplification factor of the image pickup device 12 are set to the storage time and output amplification factor of the exposure compensation value provisionally determined in the step S106 and an instruction is outputted to the signal processing circuit 43 to carry out a first storage (storage of shot image information) for recalculation of the exposure compensation value, based on the set storage time and output amplification factor, using the image pickup device 12 (step S111).

Figure 7:
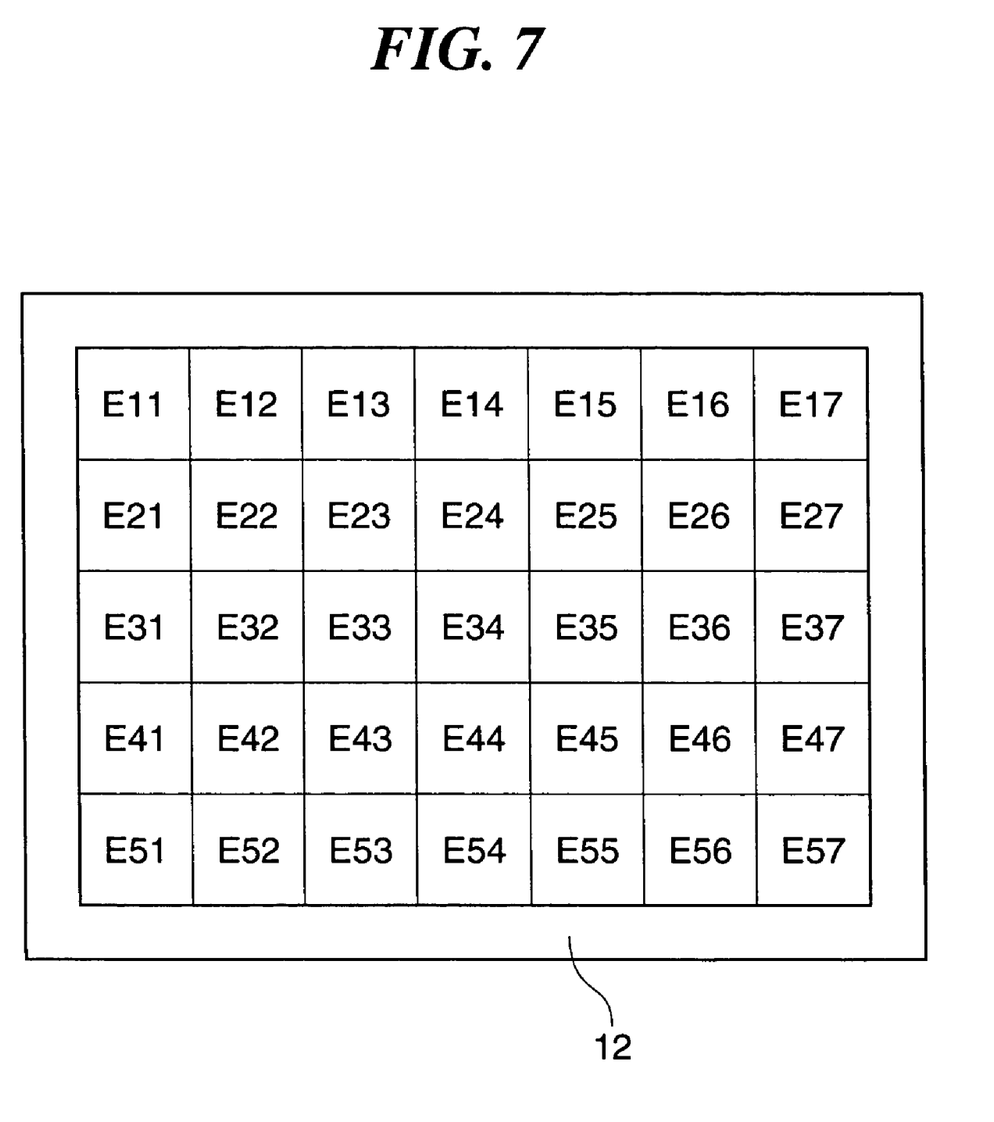
FIG. 7 is a diagram showing how shot image information of an image pickup device appearing in FIG. 1 is grouped.

An instruction is outputted to the signal processing circuit 43 to read out shot image information produced by the first storage from the image pickup device 12 and subjected to A/D conversion, and then carry out required correction processing and signal processing (step S112). This first storage is carried out for recalculating the exposure compensation value, and hence it may not be necessary to read out information corresponding to every pixel on the image pickup device 12. For example, if the image pickup device 12 is a two million pixel-class image pickup device, the pickup device has around 1,600 horizontal pixels by 1,200 vertical pixels, and it is possible to reduce the amount of read out information and shorten the read out time, such as by adding together signals for pixels or skipping read lines during reading, and group the read information so that luminance information of regions E11 to E57 corresponding to the thirty-five divided areas of the photometric sensor 26 is ultimately obtained from the information for the entire screen of the image pickup device 12 as shown in FIG. 7.

In accordance with the obtained luminance information E11 to E57, a calculation is carried out using the same algorithm as in the step S106 to recalculate the luminance information for the entire screen (step S113). The focussing screen 21 and the like do not exist on an optical path via which light is incident on the image pickup device 12, so that correct luminance information is obtained with no error. The obtained luminance information is for a state where the diaphragm 31 has already been set to the calculated value in the step S109, so that even if there was an error in the closing operation of the diaphragm 31, such error can be absorbed by finding, based on the aperture information, a storage time that results in an optimal exposure compensation value.

The storage time and output amplification factor of the image pickup device 12 are set to the storage time and output amplification factor of the exposure compensation value recalculated in the step S113, and an instruction is outputted to the signal processing circuit 43 to carry out a second storage for actual image pickup using the image pickup device 12, based on the set storage time and output amplification factor (step S114). When as a result of the calculation of exposure compensation value, it is determined that shooting should be carried out using the flash means 47, the flash means 47 is lit.

A signal is outputted to the shutter driver 42 to close the shutter (step S115). By doing so, light from the taking lens is shut out from the image pickup device 12.

Information is outputted to the lens control circuit 51 to open the diaphragm 31 (step S116). That is, in accordance with this information, the lens control circuit 51 outputs a signal to the third motor driver 54 to drive the third motor 55 so that the lens is placed into a state where the diaphragm 31 is opened.

A control signal is outputted to the first motor driver 46 so as to drive the first motor 44 to lower the main mirror 13 and the first reflective mirror 14 (step S117).

An instruction is outputted to the signal processing circuit 43 to read out the shot image information produced by the second storage and subjecting the same to A/D conversion, and then carry out required correction processing and signal processing on the digital data (S118). In addition, in this step S118, an instruction is outputted to the signal processing circuit 43 to convert the image information into a recording file format and store the shot image information in the storage medium 44.

This completes the image pickup sequence.

Next, a second embodiment of the present invention will be described.

Figure 8:
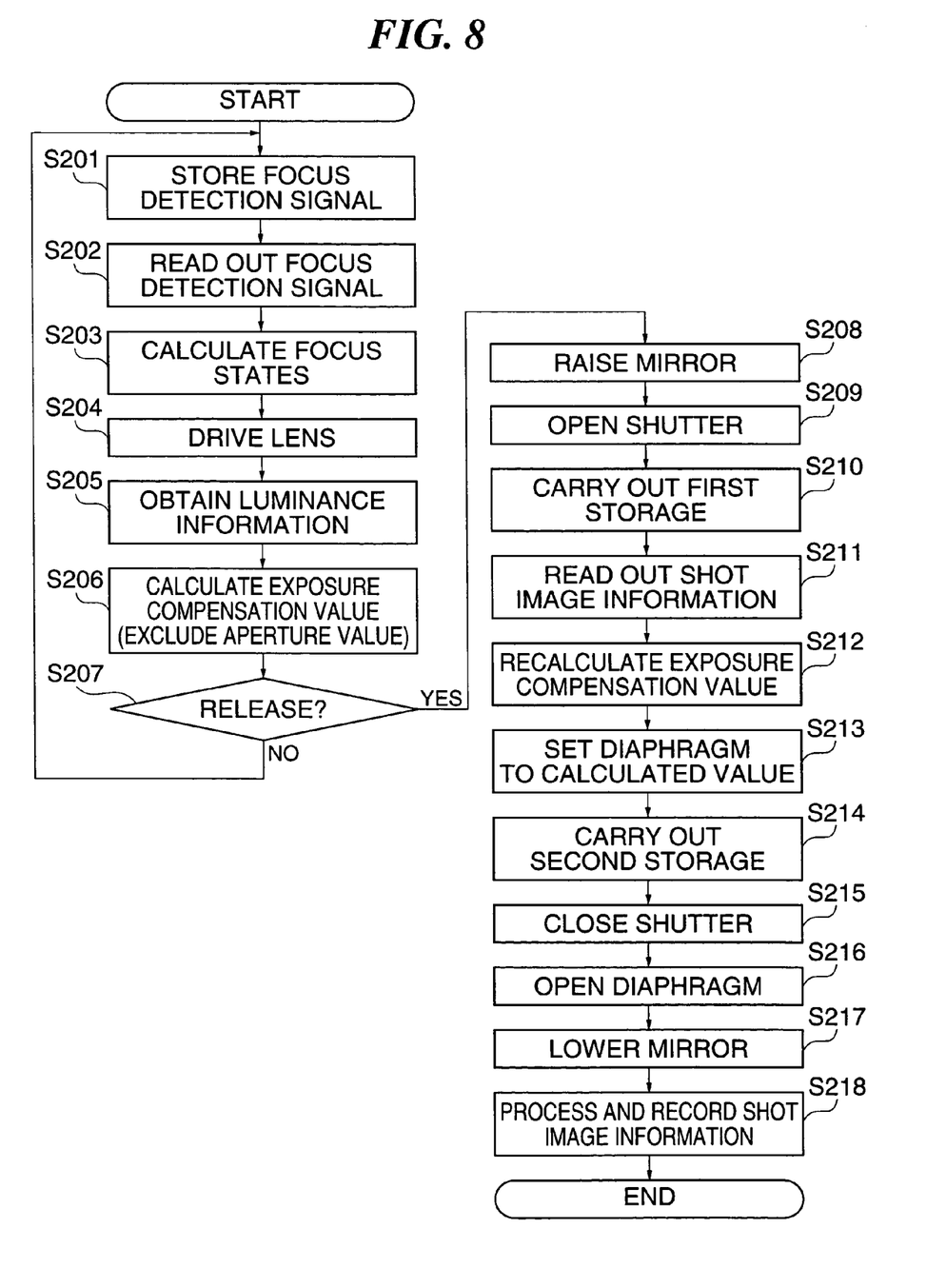
FIG. 8 is a flowchart showing an operation of a control circuit of a camera as an image pickup apparatus according to a second embodiment of the present invention.

A camera according to the second embodiment has the same construction as the camera according to the first embodiment described above and shown in FIGS. 1 to 5, but is distinguished from the latter in an image pickup sequence thereof. FIG. 8 is a flowchart showing an operation of a control means of the camera according to the second embodiment.

In the camera according to the second embodiment, when the power switch, not shown, is turned on, the main control circuit 41 is rendered operative. When the first stroke switch of the release button, not shown, is turned on, the main control circuit 41 starts an operation sequence of steps S201 et seq. in FIG. 8.

A control signal is outputted to the focus detection sensor 20 to cause the same to carry signal storage(step S201).

The stored signal by the focus detection sensor 20 is read out and subjected to A/D conversion into digital data. Various kinds of data corrections that are required for shading and the like are carried out on various digital data that have been read in (step S202).

Lens information and the like required for carrying out focus detection is acquired from the lens control circuit 51 and the focus states of respective parts of the photographic screen are calculated from the acquired lens information and the digital data acquired from the focus detection sensor 20 (step S203). A region in the photographic screen for which the subject image is to be focussed is determined from the obtained focus states of the respective parts of the photographic screen in the same manner as in the above described first embodiment. A lens moving amount for focusing in accordance with the focus state in the determined region is then calculated.

The calculated lens moving amount is outputted to the lens control circuit 51(step S204). In accordance with this amount, the lens control circuit 51 outputs a signal to the second motor driver 52 to drive the second motor 53 so as to drive the focus adjustment lens. By doing so, the taking lens is focused on the subject.

Signals are read from the respective incident light sections PD11 to PD57 as the thirty-five divided areas of the photometric sensor 26, and the read signals are subjected to A/D conversion, to thereby obtain luminance information of respective parts of the screen (step S205).

In the next step S206, required lens information and the like is acquired from the lens control circuit 51, the inputted luminance information for respective parts of the photographic screen is corrected, and luminance of the entire screen is calculated with a weighting being placed on luminance information on the luminance of divided areas corresponding to the above region to be focussed. Then, it is determined whether the subject is backlit by comparing the luminance information on the luminance of the divided areas corresponding to the region to be focussed with luminance information on the luminance of other regions, i.e. peripheral parts of the screen. When it is determined that the subject is backlit, the calculated luminance of the entire screen is corrected by a predetermined amount. If the luminance of the entire screen is lower than a predetermined value, the camera is set to carry out flashing. If the luminance of the entire screen is lower than a predetermined value, it is determined that flashing should be carried out. Based on the thus calculated luminance information for the entire screen, an exposure compensation value such as a storage time and an output amplification factor for the image pickup device 12, and a shutter speed, excluding an aperture value, that are appropriate for taking a picture are provisionally determined and displayed on the display device 48. As mentioned before, the light metering result of the photometric sensor 26 contains some an error, but, in this step S206 the exposure compensation value information is displayed so that the photographer can know information such as luminance information on the field. Also, the error is corrected later in a step S214, referred to later.

The main control circuit 41 waits for a second stroke switch of the shutter button to be turned on (step S207). If this switch is not turned on, the process returns to the step S201. If the switch is turned on, the process proceeds to a step S208.

In the step S208, a control signal is outputted to the first motor driver 45 to drive a first motor 46 so that the main mirror 13 and the first reflective mirror 14 are swung upward.

A signal is outputted to the shutter driver 42 to place the shutter 11 into an open state (step S209). By doing so, light from the taking lens becomes incident on the image pickup device 12 to enable image pickup or shooting to be carried out. It is to be noted that in the present embodiment, at this time the aperture value information is not outputted to the lens control circuit 51, that is, the aperture value is then set to an initial value, i.e. an open or maximum value, and in the present embodiment, a first storage is carried out with the aperture value fixed to the open or maximum value.

The storage time and output amplification factor of the image pickup device 12 are set to the storage time and output amplification factor of the exposure amount compensation value provisionally determined in the step S206 and an instruction is outputted to the signal processing circuit 43 to carry out a first storage for recalculation of the exposure compensation value, based on the set storage time and output amplification factor, using the image pickup device 12 (step S210).

An instruction is outputted to the signal processing circuit 43 to read out shot image information produced by the first storage from the image pickup device 12 and subjected to A/D conversion, and then carry out required correction processing and signal processing (step S211). This first storage is carried out for recalculating the exposure compensation value, and hence it may not be necessary to read out information corresponding to every pixel on the image pickup device 12. For example, if the image pickup device 12 is a two million pixel-class image pickup device, the pickup device has around 1,600 horizontal pixels by 1,200 vertical pixels, and it is possible to reduce the amount of read out information and shorten the read out time, such as by adding together signals for pixels or skipping read lines during reading, and group the read information so that luminance information of regions E11 to E57 corresponding to the thirty-five divided areas of the photometric sensor 26 is ultimately obtained from the information for the entire screen of the image pickup device 12 as shown in FIG. 7.

In accordance with the obtained luminance information E11 to E57, a calculation is carried out using the same algorithm as in the step S106 to recalculate the luminance information for the entire screen (step S212). The focussing screen 21 and the like do not exist on an optical path via which light is incident on the image pickup device 12, so that correct luminance information is obtained with no error. Unlike the first embodiment, the obtained luminance information is for a state where the diaphragm 31 is in an opened state, so that although it is not possible to absorb an error in the closing operation of the diaphragm 31, there is the merit that it is possible to determine the optimal exposure value for image pickup in this step S212 based on the correct luminance information.

The aperture value information calculated in the step S206 is outputted to the lens control circuit 51 (step S213). In accordance with this information, the lens control circuit 51 outputs a signal to the third motor driver 54 to drive the third motor so that the taking lens is placed into a state where the aperture value is set to the calculated value.

The storage time and output amplification factor of the image pickup device 12 are set to the storage time and output amplification factor of the exposure compensation value recalculated in the step S212, and an instruction is outputted to the signal processing circuit 43 to carry out a second storage for actual image pickup, based on the set storage time and output amplification factor, using the image pickup device 12 (step S214). When as a result of the exposure compensation value calculation, it is determined that shooting should be carried out using the flash means 47, the flash means 47 is lit.

A signal is outputted to the shutter driver 42 to close the shutter (step S215). By doing so, light from the taking lens is shut out from the image pickup device 12.

Information is outputted to the lens control circuit 51 to open the diaphragm 31 (step S216). In accordance with this information, the lens control circuit 51 outputs a signal to the third motor driver 54 to drive the third motor 55 and hence drive the diaphragm 31 so that the lens is placed into a state where the diaphragm 31 is opened.

A control signal is outputted to the first motor driver 45 so as to drive the first motor 46 to lower the main mirror 13 and the first reflective mirror 14 (step S217).

An instruction is outputted to the signal processing circuit 43 to read out the shot image information produced by the second storage from the image pickup device 12 and subject the same to A/D conversion into digital data, and then carry out required correction processing and signal processing on the digital data (S218). In addition, in this step S218, an instruction is outputted to the signal processing circuit 43 to convert the shot image information into a recording file format and store the image information in the storage medium 44.

This completes the image pickup sequence.

As described in detail above, according to the first and second embodiments described above, the exposure compensation value which includes errors attributed to characteristics of the individual lens devices 30 attached to the camera and errors attributed to characteristics of individual optical component parts within the camera body 10 is provisionally determined, the first storage is carried out based on the exposure compensation value, and then the exposure compensation value is set again using the result of the first storage. Thus, it is possible to set an exposure compensation value with all the above errors canceled.

In other words, even if a difference occurs in light amount balance between a central part and peripheral parts of the screen due to characteristics of individual lens devices 10 used with the camera, the influence of the difference can be eliminated.

Further, even if there are variations in characteristics of optical elements such as the focussing screen disposed on the optical path other than the image pickup device, the influence of such variations can be eliminated.

It is to be understood that the object of the present invention may also be accomplished by supplying the camera body 10 or a camera control apparatus connected to the camera body 10 to supply the camera body 10 with commands for controlling the camera body 10 with a storage medium in which a program code of software which realizes the functions of either of the above described embodiments is stored, and causing a computer (or CPU or MPU) of the camera body 10 or the cameral control apparatus to read out and execute the program code stored in the storage medium.

In this case, the program code itself read from the storage medium realizes the functions of either of the embodiments described above, and hence the storage medium in which the program code is stored constitutes the present invention.

Examples of the storage medium for supplying the program code include a floppy (registered trademark) disk, a hard disk, an optical disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of either of the above described embodiments may be accomplished not only by executing a program code read out by a computer, but also by causing an OS (operating system) or the like which operates on the computer to perform a part or all of the actual operations based on instructions of the program code. Further, it is to be understood that the functions of either of the above described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

What is claimed is:

1. An image pickup apparatus comprising:
   a taking lens;
   a main body;
   an image pickup device that receives light passing through said taking lens and outputs an image signal;
   a photometric device that receives the light passing through said taking lens and outputs luminance information;
   a control circuit that sets an exposure compensation value according to an output from said photometric device;
   wherein said control circuit acquires information on characteristics of said taking lens from said taking lens and sets a first exposure compensation value according to the acquired information on characteristics of said taking lens and the luminance information outputted from said photometric device, to cause said image pickup device to carry out a first storage of the light passing through said taking lens, based on the set first exposure compensation value, and sets a second exposure compensation value according to a result of the first storage, to cause said image pickup device to carry out a second storage of the light passing through said taking lens, based on the set second exposure compensation value.

2. An image pickup apparatus as claimed in claim 1, wherein said taking lens is removably attached to said main body.

3. An image pickup apparatus as claimed in claim 1, further comprising a mirror element, and wherein the light passing through said taking lens reaches said photometric device when said mirror element is in a first position, and the light passing through said taking lens does not reach said photometric device when said mirror element is in a second position.

4. An image pickup apparatus as claimed in claim 3, further comprising an eyepiece lens used in observing a subject by a user, and an optical element that divides the light passing through said taking lens into light reaching said photometric device and light reaching said eyepiece lens.

5. An image pickup apparatus as claimed in claim 1, wherein said photometric device outputs a plurality of pieces of luminance information for a plurality of areas into which a photographic screen is divided.

6. An image pickup apparatus as claimed in claim 1, wherein said first and second exposure compensation values each include at least one of a storage time or an output amplification factor of said image pickup device, and said control circuit causes said image pickup device to carry out the first storage by changing one of the storage time or the output amplification factor based on the first exposure compensation value, and causes said image pickup device to carry out the second storage by changing the one of the storage time and the output amplification factor based on the second exposure compensation value.

7. A control method for an image pickup apparatus including a taking lens, a main body, an image pickup device that receives light passing through the taking lens and outputs an image signal, and a photometric device that receives the light passing through the taking lens and outputs luminance information, the control method comprising:
   a photometric step of causing the photometric device to calculate field luminance information;
   a first compensation step of acquiring information on characteristics of the taking lens from the taking lens and setting a first exposure compensation value according to the acquired information on characteristics of the taking lens and the field luminance information calculated in said photometric step;
   a first storage step of causing the image pickup device to carry out a first storage of the light passing through the taking lens, based on the first exposure compensation value set in said first compensation step;
   a second compensation step of setting a second exposure compensation value according to a result of the first storage carried out in said first storage step; and
   a second storage step of causing the image pickup device to carry out a second storage of the light passing through the taking lens, based on the second exposure compensation value set in said second compensation step.

8. A control method as claimed in claim 7, wherein the taking lens is removably attached to the main body.

9. A control method for an image pickup apparatus including a taking lens, an image pickup device, and a photometric device disposed at a location different from a location at which the image pickup device is disposed, the image pickup apparatus being switchable between a state in which light passing through the taking lens is caused to reach the photometric device, and a state in which the light passing through the taking lens is not caused to reach the photometric device, the control method comprising:
   a photometric step of causing the photometric device to determine field luminance information;
   a first compensation step of acquiring information on characteristics of the taking lens from the taking lens and setting a first exposure compensation value according to the acquired information on characteristics of the taking lens and the field luminance information determined in said photometric step;
   a first storage step of causing the image pickup device to carry out a first storage of the light passing through the taking lens, based on the first exposure compensation value set in said first compensation step;
   a second compensation step of setting a second exposure compensation value according to a result of the first storage carried out in said first storage step; and
   a second storage step of causing the image pickup device to carry out a second storage of the light passing through the taking lens, based on the second exposure compensation value set in said second compensation step.

10. A control method as claimed in claim 9, wherein the control method causes the light passing through the taking lens to reach only one of the image pickup device or the photometric device.

11. A computer-readable storage medium storing a computer program for implementing a control method for an image pickup apparatus including a taking lens, a main body, an image pickup device that receives light passing through the taking lens and outputs an image signal, and a photometric device that receives the light passing through the taking lens and outputs luminance information, the computer program comprising:

a photometric module for causing the photometric device to calculate field luminance information;

a first compensation module for acquiring information on characteristics of the taking lens from the taking lens and setting a first exposure compensation value according to the acquired information on characteristics of the taking lens and the field luminance information calculated by said photometric module;

a first storage module for causing the image pickup device to carry out a first storage of the light passing through the taking lens, based on the first exposure compensation value set by said first compensation module;

a second compensation module for setting a second exposure compensation value according to a result of the first storage carried out by said first storage module; and     a second storage module for causing the image pickup device to carry out a second storage of the light passing through the taking lens, based on the second exposure compensation value set by said second compensation module.

12. A computer-readable storage medium storing a computer program for implementing a control method for an image pickup apparatus including a taking lens, an image pickup device, and a photometric device disposed at a location different from a location at which the image pickup device is disposed, the image pickup apparatus being switchable between a state in which light passing through the taking lens is caused to reach the photometric device, and a state in which the light passing through the taking lens is not caused to reach the photometric device, the computer program comprising:

a photometric module for causing the photometric device to determine field luminance information;

a first compensation module for acquiring information on characteristics of the taking lens from the taking lens and setting a first exposure compensation value according to the information on characteristics of the taking lens and the field luminance information determined by said photometric module;

a first storage module for causing the image pickup device to carry out a first storage of the light passing through the taking lens, based on the first exposure compensation value set by said first compensation module;

a second compensation module for setting a second exposure compensation value according to a result of the first storage carried out by said first storage module; and     a second storage module for causing the image pickup device to carry out a second storage of the light passing through the taking lens, based on the second exposure compensation value set by said second compensation module.

* * * * *